(12) United States Patent
Csabai et al.

(10) Patent No.: US 10,225,100 B2
(45) Date of Patent: Mar. 5, 2019

(54) CONTROL ELECTRONICS FOR AN AGRICULTURAL OR FORESTRY VEHICLE

(71) Applicant: Continental Automotive GmbH, Hannover (DE)

(72) Inventors: Peter Csabai, Vienna (AT); Christian Fleischer, Vienna (AT)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/572,339

(22) PCT Filed: May 4, 2016

(86) PCT No.: PCT/EP2016/059974
§ 371 (c)(1),
(2) Date: Nov. 7, 2017

(87) PCT Pub. No.: WO2016/177768
PCT Pub. Date: Nov. 10, 2016

(65) Prior Publication Data
US 2018/0123824 A1  May 3, 2018

(30) Foreign Application Priority Data

May 7, 2015 (DE) .................. 10 2015 208 495

(51) Int. Cl.
*H04L 12/40* (2006.01)
*H04L 12/10* (2006.01)
(Continued)

(52) U.S. Cl.
CPC ........ *H04L 12/40045* (2013.01); *A01B 76/00* (2013.01); *B60R 16/023* (2013.01);
(Continued)

(58) Field of Classification Search
CPC .... A01B 76/00; B60R 16/0315; B60R 16/023
See application file for complete search history.

(56) References Cited

U.S. PATENT DOCUMENTS

2012/0284538 A1    11/2012 Linne et al.

FOREIGN PATENT DOCUMENTS

DE          4028242 A1      3/1992
DE         19850869 A1      5/2000
(Continued)

OTHER PUBLICATIONS

ISR dated Jul. 11, 2016 of corresponding International patent application No. PCT/EP2016/059974.
(Continued)

*Primary Examiner* — Robert L Deberadinis

(57) ABSTRACT

Control electronics for an agricultural or forestry vehicle or an agricultural or forestry machine, having power connections at least for a first supply network (45, 46) and a second supply network (56, 57) and having at least one network connection (80), wherein the control electronics contain a communication circuit (70) which is configured to transmit data via the network connection (80) and is supplied via the first supply network (45, 46), and a logic circuit (69) which is coupled to the communication circuit (70) and has at least one control output for controlling an electrical load (84, 85) supplied via the second supply network (56, 57), having at least one switch (77) which is configured to connect the first supply network (45, 46) to the second supply network (56, 57), with the result that the two supply networks (45, 46, 56, 57) have at least one defined minimum isolation impedance in a switched-off state of the at least one switch (77), and a method for switching on such control electronics.

11 Claims, 4 Drawing Sheets

(51) Int. Cl.
*A01B 76/00* (2006.01)
*B60R 16/023* (2006.01)
*B60R 16/03* (2006.01)
(52) U.S. Cl.
CPC .......... *B60R 16/0315* (2013.01); *H04L 12/10* (2013.01); *H04L 2012/40215* (2013.01); *H04L 2012/40273* (2013.01)

(56) References Cited

FOREIGN PATENT DOCUMENTS

| DE | 102008054885 A1 | 6/2010 |
| DE | 102009052157 A1 | 5/2011 |
| DE | 102009058362 A1 | 6/2011 |
| DE | 102010052661 B3 | 2/2012 |
| EP | 2765713 A1 | 8/2014 |

OTHER PUBLICATIONS

DE Office Action dated Mar. 21, 2016 of corresponding German patent application No. 10 2015 208 495.7.
English Abstract of DE 4028242 A1.
English Abstract of DE 102008054885 A1.
English Abstract of DE 102009058362 A1.
English Abstract of DE 19850869 A1.
English Abstract of EP 2765713 A1.
English Abstract of DE 102010052661 B3.

CONTROL ELECTRONICS FOR AN AGRICULTURAL OR FORESTRY VEHICLE

The invention relates to control electronics for an agricultural or forestry vehicle or an agricultural or forestry machine, having power connections at least for a first supply network having a first reference potential and a second supply network having a second reference potential and having at least one network connection, wherein the control electronics contain a communication circuit which is configured to transmit data via the network connection and is supplied via the first supply network, and a logic circuit which is coupled to the communication circuit and has at least one control output for controlling an electrical load supplied via the second supply network, and a method for switching on such control electronics, i.e. for switching on the power supply of the control electronics.

Modern bus systems for agricultural and forestry vehicles and machines (e.g. the standard ISO 11783, "ISOBUS") define, for the purpose of ensuring low susceptibility to interference of the communication between the electronic control units (ECUs) mounted on an agricultural or forestry traction machine or the trailers thereof, the implementation of a communication system (e.g. in the form of a bus system) with potential-free supplies (e.g. via a 9-conductor bus connection for ISOBUS) with the following properties:

the application of a two-conductor communication network (e.g. of a CAN network) which serves exclusively for this purpose, and the associated communication sequences;

the application of a three-conductor bus termination network (terminating bias circuit, TBC) which ensures that a connection which is intended to lengthen the CAN bus does not have a counterpart which is connected to it and which terminates the bus correctly, so that reflections of the data signals are suppressed;

the application of two electrically isolated supply networks, one of which is intended for loads and actuators (e.g. in ISO 11783 the "PWR" and "GND"—up to a maximum of 50 ampere current strength), and the other supply network (e.g. in ISO 11783 the "ECU_PWR" and "ECU_GND" up to a max of 15 ampere current strength) is intended for the logic part of the individual ECUs, which also electrically includes the abovementioned communication network (CAN network); not only a (purely theoretical) complete electrical isolation but also an isolation with a defined isolation impedance is referred to here as electrical isolation.

The two supply networks are intended to have on the traction machine (in an ECU traction machine or ECU tractor, also referred to as TECU) and at the trailer (or "implement") a defined first minimum isolation impedance (e.g. in ISO 11783 at least 1 MOhm) as well as in the system bus ("implement bus") a defined second minimum isolation impedance (e.g. in ISO 11783 at least 5 MOhm) and are combined here at just one point (e.g. at the negative pole of a battery) on the traction machine.

or in more detail:

the ground connections (GND and ECU_GND) of the two supply networks come together at a single point (at the negative pole of the battery) exclusively on the traction machine side. In order to avoid ground loops, galvanic isolation of the two supply networks is required on the trailer side (on the implement). On the trailer side, a minimum impedance between GND and ECU_GND of 5 MOhm is also required if no ECU is connected to the bus.

ECUs which are connected to such a communication bus are to have a minimum impedance of 1 MOhm between their GND and ECU-GND connections.

In a system (e.g. according to ISOBUS) which is equipped with this type of electrical isolation, what is referred to as a main ECU (also tractor ECU or for short TECU) functions as a coordinator and monitor of the system bus functionality and ensures that an ignition signal (also referred to as terminal_15 signal) is transmitted to all the ECU controllers connected to the system bus (ISOBUS) if the vehicle key is at the ON position; the transmission can take place via the power supply itself or via the system bus; and the ignition signal (terminal_15 signal) remains activated for a certain minimum period (e.g. at least an additional two seconds) for all the ECU controllers connected to the system bus (ISOBUS), after the vehicle key has been turned to the OFF position.

A TECU, connected, e.g. to an ISOBUS, is also to be able to function as a gateway, i.e. as a communication interface between the communication network and an ECU which is not integrated into the communication network, is, for example, not compatible with the standards and is part of the overall system.

In control electronics for an electronic control unit (ECU) which corresponds to the above requirements, electrical isolation is therefore necessary between the communication network and the connected power components, i.e. the communication network and the power components are potential-free with respect to one another. Such an isolation is usually achieved by virtue of the fact that the control signals for the power components are transmitted via electrically isolated couplings. Such a coupling can be implemented optically, magnetically, capacitively or by radio connection for example. In any case, such a solution entails considerable expenditure and corresponding costs owing to the number of signal paths to be isolated.

An object of the invention is to provide economical control electronics which can be manufactured as cost-effectively as possible and which are configured to participate in a communication network—and to control loads which are supplied via a supply network which is potential-free with respect to the communication network, wherein the reference potential of the first supply network, referred to as "ECU_GND" has an isolation impedance of preferably at least 1 MOhm with respect to the reference potential of the second supply network, referred to as "GND".

This object is achieved in the control electronics according to the invention of the type specified at the beginning in that at least one switch is configured to connect the first supply network to the second supply network, with the result that the two supply networks have at least one defined minimum isolation impedance, in particular at least one defined minimum isolation impedance between the reference potentials of the two supply networks, i.e. between the (first) reference potential of the first supply network and the (second) reference potential of the second supply network in a switched-off state of the at least one switch.

The invention is based on the realization that the freedom from potential is generally defined only in the switched-off state or voltageless state of the system, i.e. of the vehicle, of the machine or of the "implement" and is defined and required or necessary in the case of a system bus with separate control electronics. In this state, the switch is opened, with the result that the two supply networks are isolated at least by the minimum isolation impedance. In the switched-on state of the system, the switch can be at least temporarily closed, with the result that the electrical isolation is temporarily eliminated and therefore a—comparatively cost-effective—electrically conductive connection is established between the communication network, the logic circuit and the actuation of loads as well as the electrical loads. The coupling of the control signals can then be carried out by means of one or more electrically conductive connections, which considerably reduces the expenditure and the manufacturing costs for the control electronics.

If the switch is a MOSFET, i.e. a metal oxide semiconductor field-effect transistor, high isolation impedances can also be implemented in a cost-effective way. In this context, the use of a MOSFET of the p-type, which generally has a higher isolation impedance than comparable switches of the n-type, is particularly favorable.

It is also advantageous if the defined minimum isolation impedance, in particular, between the reference potentials of the two supply networks is at least 1 Megaohm. With this minimum isolation impedance, the control electronics correspond to the relevant requirements of the international standard ISO 11783 for electronics on the traction unit and on the implement. The defined minimum isolation impedance can preferably be, measured on the system bus and in the case of control electronics which are isolated from a system bus, at least 5 Megaohms, which corresponds to the requirements of the ISO 11783 for the system bus (implement bus).

In conjunction with the arrangement of the switch, it has proven favorable if the at least one switch is connected downstream of the at least one control output of the logic circuit. In this way, in the switched-off state of the system when the switch is opened (or—in the case of a plurality of switches—if all the switches are opened), all the control outputs of the logic circuit are electrically isolated from the controlled loads and from the second supply network which supplies them. The logic circuit can therefore be supplied via the first supply network. In this case, the logic circuit is arranged in the same supply network as the communication circuit and can therefore be connected directly in an electrically conductive fashion to the latter. In the switched-on state, the switch (or the switches) is/are closed and the control signals can be transmitted via the electrically conductive connections via the switch (or switches) to the controlled loads in the second supply network.

Alternatively, and according to one preferred embodiment, the logic circuit can be supplied via the second supply network, wherein the switch is connected between the connection for the first supply network and the logic circuit, with the result that the logic circuit is configured to provide a temporary supply via the first supply network. In this case, the logic circuit is arranged in the same supply network as the loads to be controlled and can therefore be connected directly in an electrically conductive fashion to the latter. That is to say that the electrical isolation of the reference potential is set to the interface level between the communication circuit and the logic circuit of the ECU where a significantly lower number of electrically isolated couplers has to be provided than in the case of electrical isolation on the interface level between the logic circuit of the ECU and the individual power switches. In the simplest case, therefore just one switch is necessary, specifically between the connection for the first supply network and the logic circuit, for electrical isolation. Quite generally and independently of the use of a switch, in control electronics of the type specified at the beginning it is advantageous if electrical isolation is provided between the communication circuit and the logic circuit because at this point a coupling can be provided with relatively low expenditure.

In conjunction with control electronics according to the last-mentioned embodiment, and with respect to the method according to the invention of the type specified at the beginning the control electronics are preferably embodied in such a way that after an ignition signal of the agricultural or forestry vehicle or of the agricultural or forestry machine the first supply network is connected to a voltage supply, the switch of the control electronics is closed having been triggered by the voltage at the first supply network, and a temporary supply of the logic circuit is provided via the first supply network, the logic circuit subsequently confirms the supply via the communication circuit and the network connection, and the second supply network is subsequently connected to a voltage supply. On the basis of the temporary supply via the first supply network, which is generally firstly supplied with voltage the logic circuit can participate in initialization of the control electronics of the system which are connected to the communication network, said initialization taking place before activation of the second supply network. The logic circuit can therefore already carry out a data transmission via the network connection before a voltage is applied to the second supply network. Therefore, in this case there is no need for a separate logic circuit for initializing the communication network.

Furthermore, in conjunction with the control electronics described above having a switch between the connection for the first supply network and the logic circuit, it is particularly advantageous if the control electronics are embodied in such a way that the switch is opened having been triggered by the voltage at the second supply network, and the temporary supply of the logic circuit via the first supply network is ended, wherein the communication circuit continues to be supplied by the first supply network. The control electronics are therefore configured to establish, after an initialization or switching-on process, galvanic isolation again between the communication network and the communication circuit on the one hand, and the electrical loads and the logic circuit on the other.

In order additionally to implement, in the switched-on state, i.e. during operation of the system, such electrical isolation between the logic circuit and the communication circuit, the logic circuit can be coupled to the communication circuit via a transformer, a capacitor, an optocoupler, an optical waveguide or a relay. Such couplings permit a signal transmission and data transmission without an electrically conductive connection between the users. Owing to the, at first sight, contra-intuitive routing of the isolation between the two circuits instead of—as appears natural—between the logic circuit and the loads to be controlled, just one electrically isolated signal coupling is necessary, which signifies a considerable cost saving.

The invention will be explained in more detail below on the basis of a particularly preferred exemplary embodiment, to which, however, it will not be restricted, and with reference to the drawings. In the drawings, in particular:

Figure 1:
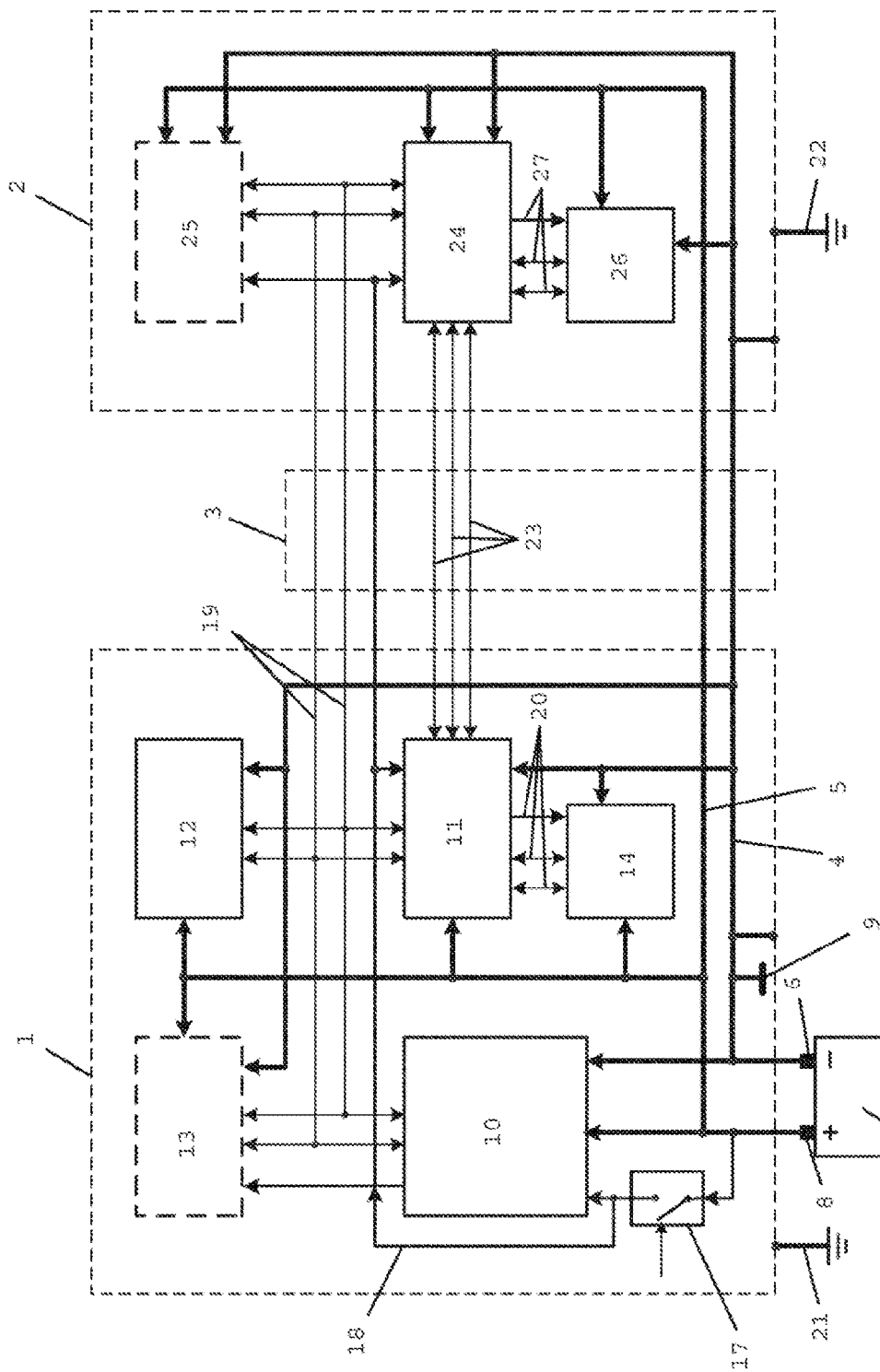
FIG. 1 shows a schematic block circuit diagram of a currently customary system design for an agricultural application.

FIG. 1 shows in a simplified schematic form the design of control electronics of an agricultural application comprising a tractor 1 or a traction machine, an implement 2 (e.g. a trailer) and a cable harness 3 for connecting the implement 2 to the tractor 1. The application has just a single supply network 4, 5 with a ground connection 4 (or reference line) and a supply line 5. The ground connection 4 is connected to the negative pole 6 of a battery 7 of the tractor 1, and the supply line 5 is connected to the positive pole 8 of the battery 7. The ground connection 4 is also connected to the housing of the tractor 1 via a functional ground connection 9. The supply network 4, 5 supplies, on the tractor 1, both a central electronic tractor control unit 10 and additional electronic control units 11, 12, 13 as well as a local control unit 14.

The control units 10-14 are connected directly to the ground connection 4, wherein the housings of the control units 10-14 can be connected via functional ground connections to the chassis of the tractor or that of the trailer.

The tractor control unit 10 is connected to an ignition switch 17, wherein an ignition signal is transmitted via an ignition signal line 18 which is branched off from the supply line 5. Both the tractor control unit 10 and some of the further control units 11, 13 are connected to the ignition signal line and configured to receive an ignition signal when the ignition is activated. Alternatively, the ignition signal line 18 leads only into a first ECU, and this ECU then distributes a separate, derived ignition signal to the other ECUs in the entire system. Furthermore, the control units 11, 12, 13 are connected to one another and to the tractor control unit 10 via a data network in the form of a two-conductor CAN bus 19. The local control unit 14 is not directly connected to the CAN bus 19. The communication with the local control unit 14 takes place via the control unit 11 which is connected to it directly via local communication connection 20 and the local ignition signal, which control unit 11 is configured as a gateway or transfer point.

The housing of the tractor 1 is grounded in the illustrated design, as is also the housing of the implement 2, via ground connections 21, 22.

The cable harness 3 comprises connecting lines for the supply network 4, 5, the ignition signal line 18, the CAN bus 19 as well as additional direct connecting lines 23 between the control unit 11 of the tractor and an electronic control unit 24 of the implement 2. The implement 2 comprises, apart from this control unit 24, a further optional electronic control unit 25 and a local control unit 26. The two control units 24, are connected to the supply network 4, 5, the ignition signal line 18 and the CAN bus 19. The local control unit 26 of the implement 2 is not connected to the CAN bus 19, but rather directly to the control unit 24 via local communication connections 27 and the local ignition signal, which control unit 24 functions as a gateway for the local control unit 26. Furthermore, the ground connection 4 in the implement 2 is connected to the housing thereof.

The control units 10, 11, 12, 13, 24, 25 can be activated by means of the ignition signal. As an alternative to the illustrated direct connection to the ignition switch 17, the ignition signal can also be received only by one control unit and passed on to the other control units, as illustrated in the case of the (local) control units 14, 26.

Figure 2:
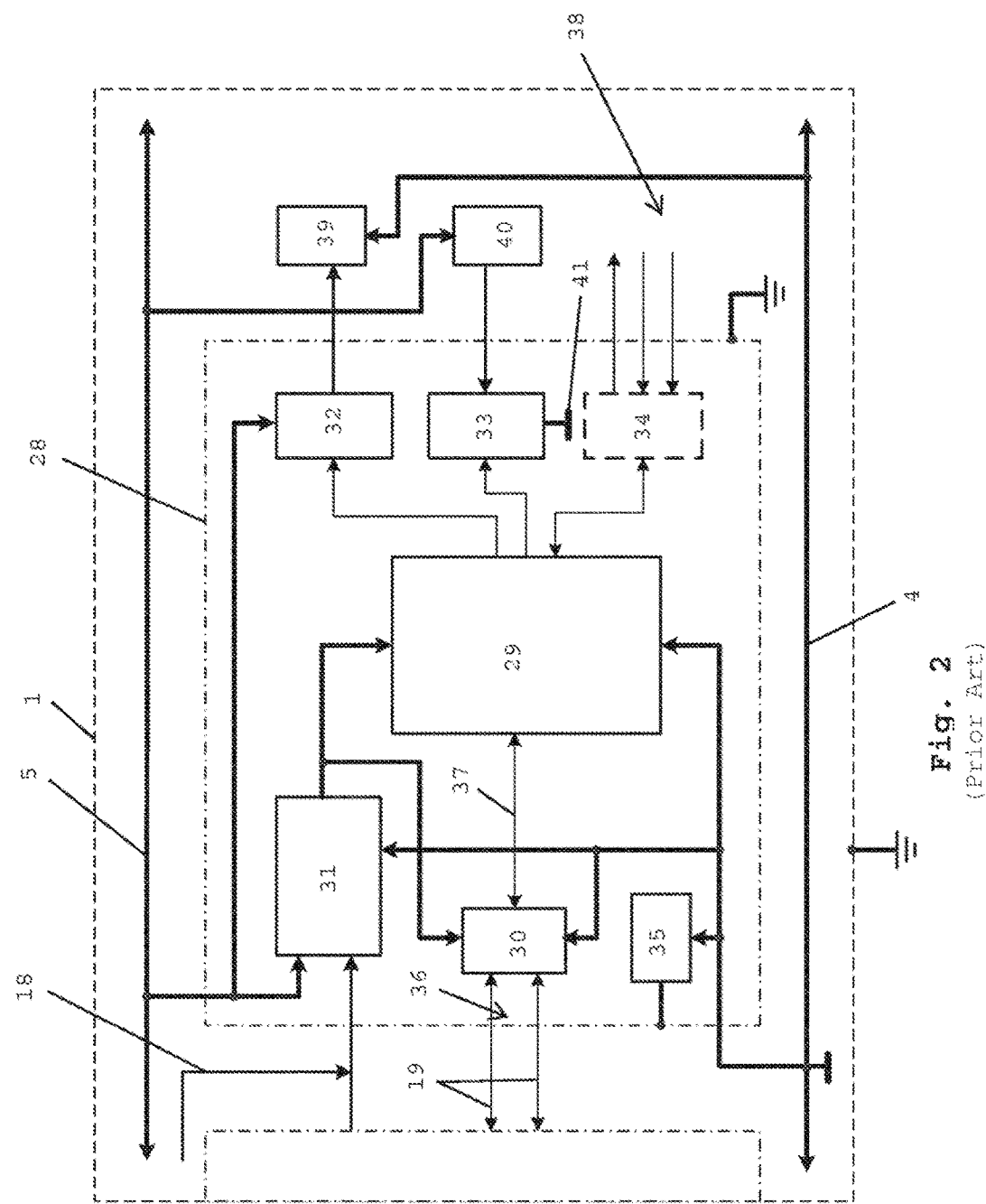
FIG. 2 shows a schematic block circuit diagram of the electronic control unit according to FIG. 1 in more detail.

FIG. 2 illustrates in more detail a control unit 28 of the type of the control units 11, 12, 13, 14, 24 or 25 according to FIG. 1. The illustrated control unit 28 comprises control electronics which contain a logic circuit 29, a communication circuit 30, a supply circuit 31, two driver circuits 32, 33, an optional local communication circuit 34 and a protective circuit 35. The supply circuit 31 of the control electronics or control unit 28 is connected to the supply line 5 of the tractor 1 (see FIG. 1) and supplies both the logic circuit 29 and the communication circuit 30 with current. The logic circuit 29 and the communication circuit 30 are themselves connected to the ground connection 4 of the tractor 1. They are accordingly supplied with current via the supply network 4, 5 of the tractor 1. The driver circuits 32, 33 are integrated directly into the supply network 4, 5. The supply circuit 31 is connected to the ignition signal line 18 of the tractor 1 and configured to supply the logic circuit 29 and the communication circuit 30 with current only when an ignition signal is applied. The communication circuit 30 is connected via a network connection 36 to the CAN bus 19 of the tractor 1 and is configured to transmit data via the network connection 36 and the CAN bus 19. The communication circuit 30 is electrically connected internally to the logic circuit 29 via a local signal line 37; the same applies to the signal connections between the logic circuit 29 and the driver circuits 32, 33 as well as the optional local communication circuit 34, which, moreover, makes available to the outside a local network connection 38 for connecting at least one local control unit.

Loads 39, 40 are connected to the driver circuits 32, 33 and are connected to the supply line 5 and/or the ground connection 4. In particular, the load 39 is supplied via the driver circuit 32, and the latter is connected to the ground connection 4. The load 40 is supplied directly via the supply line 5 and is connected to the functional ground 41 via the driver circuit 33. In practice, the driver circuit 33 is connected directly to the ground connection 4 in the controller, wherein the illustration shown serves merely for the sake of clarity.

The activation of the control unit 28 takes place by means of an ignition signal on the ignition signal line 18. The ignition signal can also be used to supply the logic part, i.e. the logic circuit 29, and the communication circuit 30, wherein a defined load current must not be exceeded. In general, in the control electronics illustrated in FIG. 2 the communication circuit 30 and therefore the communication interface which is made available, i.e. the CAN bus, is fed via the supply network. In particular, the reference of the bus signals on the CAN bus is the common ground connection 4. In order to protect the components, an ESD protective circuit 35 can optionally be provided. Such a protective circuit 35 is expedient in particular when a specific protective action of the control unit 28 or of the tractor 1 or of the implement 2 is to take place, e.g. in the case of static charging during electrostatic surface coating.

The systems illustrated in FIG. 1 and FIG. 2 have just a single supply network and therefore, of course, cannot make available any supply networks which are free of potential. As a result, they do not correspond, for example, to the requirements in the relevant standards (see introduction). In particular, crosstalk from the supply of the loads to the communication network cannot be effectively suppressed here.

Figure 3:
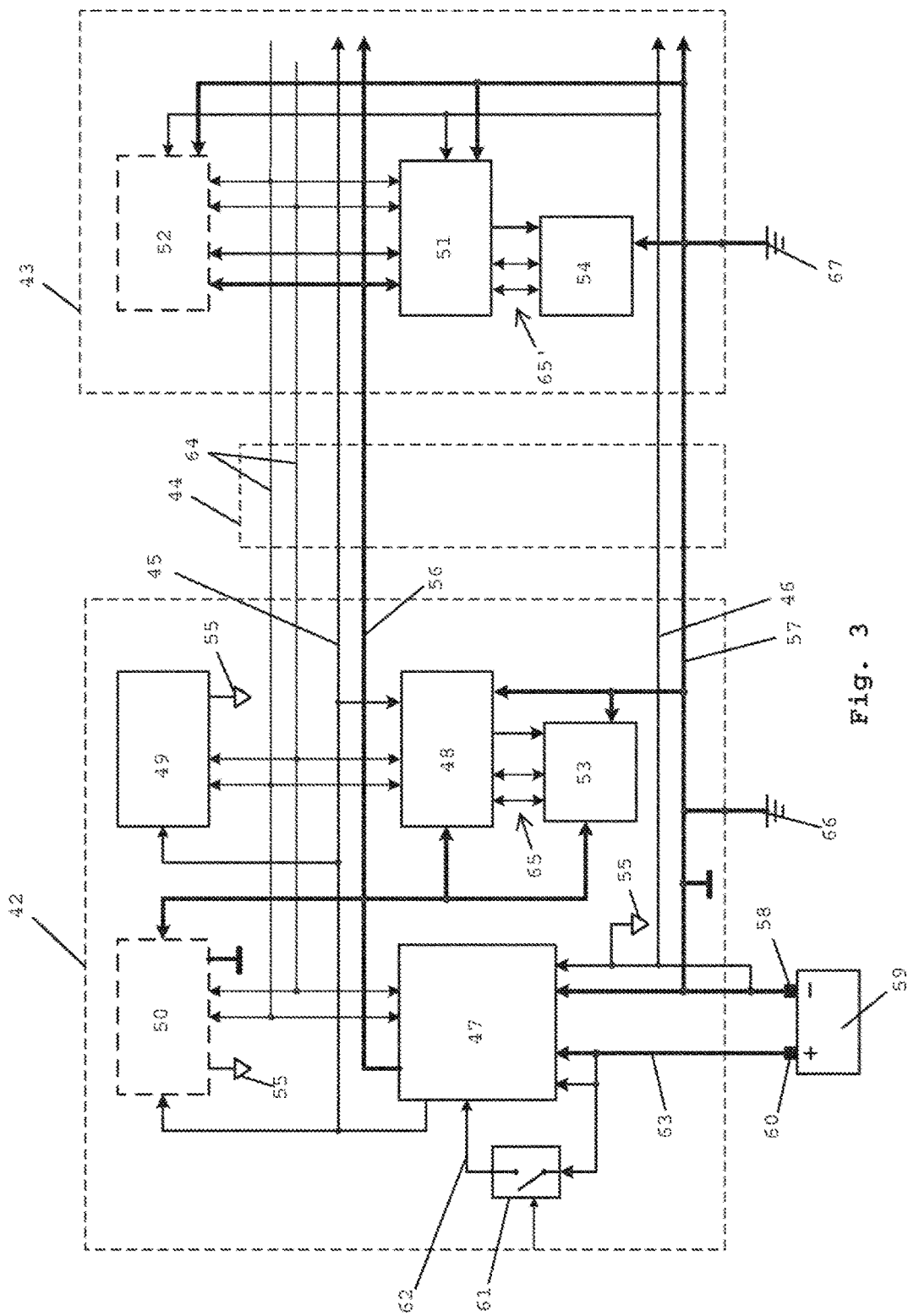
FIG. 3 shows a schematic block circuit diagram of a system design for an agricultural application with supply networks which are free of potential with respect to one another.
Figure 4:
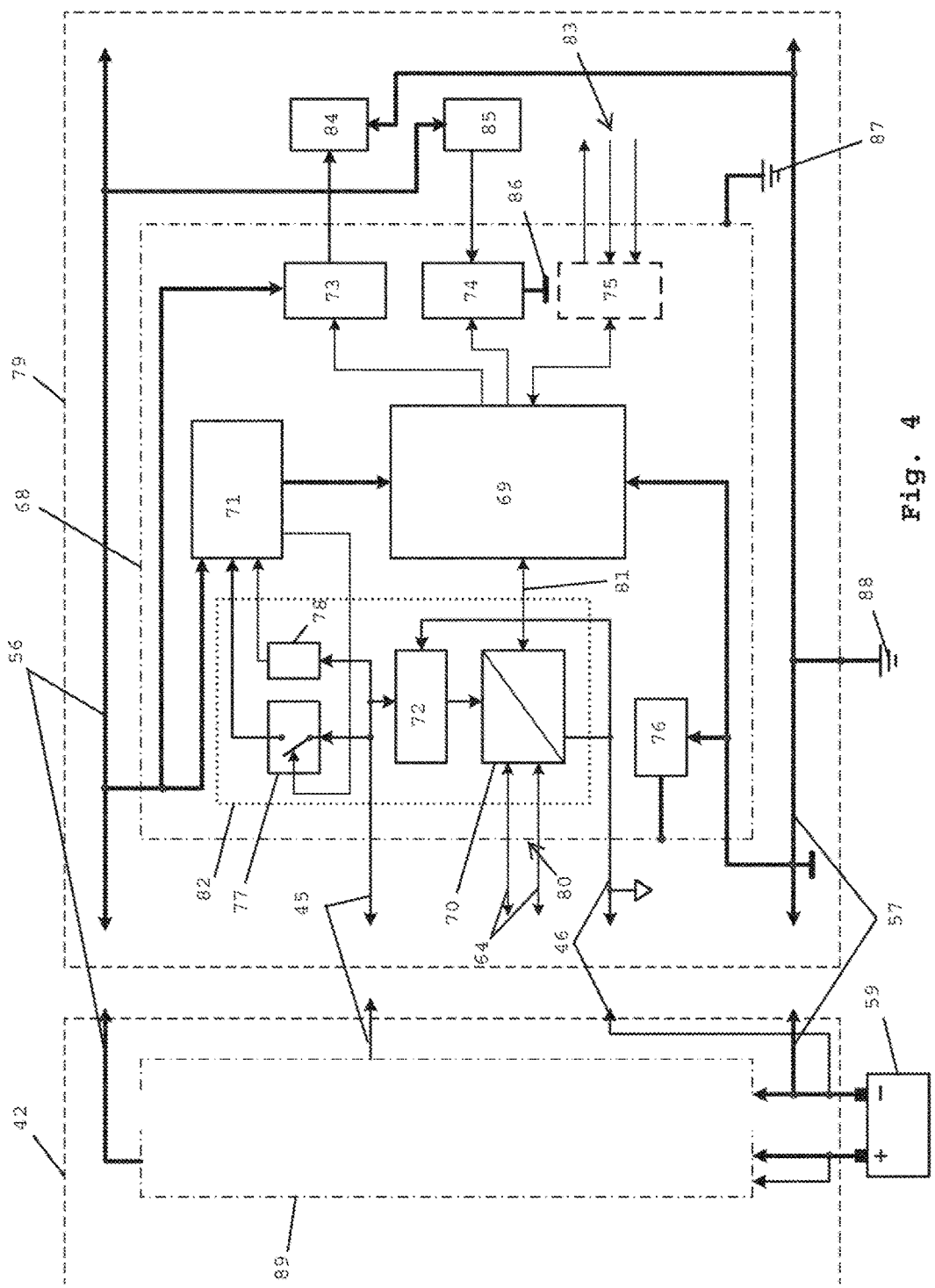
FIG. 4 shows a schematic block circuit diagram of the electronic control unit according to FIG. 3 in more detail and according to the present control electronics.

In contrast, FIGS. 3 and 4 show a preferred application and embodiment of the present control electronics. FIG. 3 shows in a simplified schematic form the design of control electronics of an agricultural application comprising a tractor 42 or a traction machine, an implement 43 (e.g. a trailer or an attachment device) and a cable harness 44 for connecting the implement 43 to the tractor 42. The architecture shown is ISOBUS-compatible because the entire voltage supply is of isolated design.

Specifically, the application according to FIG. 3 has a first supply network 45, 46 which comprises a supply line 45, fed by a central electronic tractor control unit 47, and a separate ground connection 46, and is configured to supply energy to additional control units 48, 49 and to an optional control unit 50 on the tractor 42 and the control unit 51 and the optional control unit 52 on the implement 43. Local control units 53 and 54 which are not ISOBUS-compatible, on the tractor 42 or on the implement 43, are not connected to the first supply network 45, 46. The supply line 45 of the first supply network 45, 46 assumes in this design the place of the ignition signal line 18 according to FIGS. 1 and 2. The ground connection 46 of the first supply network 45, 46 is formed by an additional line in comparison with the previously shown system (FIGS. 1 and 2). For the purpose of better clarity, many control units 49, 50 are not connected directly to the ground connection 46 of the first supply network 45, 46 but instead the connection is illustrated as equi-potential 55. In practice, all the control units which are ISOBUS-compatible are always connected directly to the ground connection 46; the illustration merely shows a simplification in terms of graphic representation.

Furthermore, the application has a second supply network 56, 57 which comprises a supply line 56 and a ground connection 57 and is configured to supply the control units 47, 48 and 50-52 (the additional control unit 49 does not have any loads to control and is therefore only connected to the first supply network) and the local control units 53, 54. The ground connection 46 of the first supply network 45, 46 is electrically isolated from the ground connection 57 of the second supply network 56, 57, with the exception of a connecting point at the negative pole 58 of a battery 59 of the tractor 42, wherein the isolation impedance for the controllers on the tractor 42 and on the implement 43 is higher than 1 MOhm, and the isolation impedance between the ground connections 46, 57 is higher than 5 MOhm when measured on the system bus (implement bus) in the voltageless state and without control electronics connected. The supply line 56 of the second supply network 56, 57 is connected to the positive pole 60 of the battery 59 via the tractor control unit 47 and the common supply line 63. The tractor control unit 47 is connected to an ignition switch 61, wherein an ignition signal is transmitted via an ignition signal line 62, branched off from the common supply line 63. Furthermore, the control units 48-52 are connected to one another and to the tractor control unit 47 via a data network in the form of a two-conductor CAN bus 64. The local control units 53, 54 are not connected to the CAN bus 64 but rather are configured for communication via one of the control units 48 and 51 and are directly connected to the respective control unit 48 and 51 via local control lines 65, 65' with the result that the control units 48, 51 function as gateways. The housing of the tractor 42 is grounded in the illustrated design, as is the housing of the implement 43, by means of ground connections 66, 67.

The implement 43 is connected to the tractor 42 via the cable harness 44. The cable harness 44 comprises connecting lines for the first supply network 45, 46, the second supply network 56, 57 and the CAN bus 64. Of course, additional connecting lines can be provided.

When the ignition is activated, the tractor control unit 47 establishes a supply voltage at the first supply network 45, 46 by connecting the supply line 45 of the first supply network 45, 46 to the central supply line 63. The control units 48-52, which are supplied via the first supply network 45, 46, are as a result activated and confirm, via the CAN bus 64, the voltage supply established via the first supply network 45, 46. Subsequently, the tractor control unit 47 establishes a supply voltage at the second supply network 56, 57 by connecting the supply line 56 of the second supply network 56, 57 to the central supply line 63.

FIG. 4 illustrates in more detail the inventive control electronics with a control unit 68 of the type of the control units 48-52 according to FIG. 3, with the omission of the cable harness 44. The illustrated control unit 68 comprises control electronics which contain a logic circuit 69, a communication circuit 70, a central supply circuit 71, a local supply circuit 72, two driver circuits 73, 74, an optional local communication circuit 75, a protective circuit 76, a switch 77 and a voltage detector 78. The central supply circuit 71 of the control electronics is connected to the supply line 56 of the second supply network 56, 57 of the application 79 i.e. of the tractor 42 or of the implement 43, and supplies the logic circuit 69 with current. The logic circuit 69 is itself connected to the ground connection 57 of the second supply network 56, 57 of the application 79. It is accordingly supplied with current via the second supply network 56, 57 of the tractor 42, via the tractor control unit 47 and the battery 59 thereof. The driver circuits 73, 74 are integrated directly into the second supply network 56, 57.

The central supply circuit 71 is additionally connected via the switch 77 to the supply line 45 of the first supply network 45, of the tractor 42 and is configured to supply the logic circuit 69 with current from the first supply network 45, 46 when the switch 77 is closed.

The local supply circuit 72 of the control electronics is connected to the supply line 45 of the first supply network 45, 46 of the application 79 and supplies the communication circuit with current. The communication circuit 70 is itself connected to the ground connection 46 of the first supply network 45, 46 of the application 79. It is accordingly supplied with current via the first supply network 45, 46 of the tractor 42. The communication circuit 70 is connected to the CAN bus 64 of the tractor 42 via a network connection 80 and is configured to transmit data via the network connection 80 and the CAN bus 64. The communication circuit 30 is coupled to the logic circuit 69, with internal electrical isolation via a local signal connection 81.

The coupling is a signal coupling between the circuits 69, 70, electrically isolated when the switch 77 is opened, of the control electronics. The coupling is preferably established via an optocoupler. The communication circuit 70, the local supply circuit 72, the switch 77 and the voltage detector 78 therefore form a region 82 of the control electronics which is isolated with defined isolation impedance with respect to the logic circuit 69 and the driver circuits 73, 74 when the switch 77 is opened. The connections between the logic circuit 69 and the driver circuits 73, 74 as well as the local communication circuit 75, which makes available to the outside a local network connection 83, e.g. for connecting at least one local control unit, are conductive electrical connections.

Electrical loads 84, 85, e.g. electrical actuators or lighting devices, are connected to the driver circuits 73, 74 and connected to the supply line 56 and/or the ground connection 57 of the second supply network 56, 57. In particular, the one load 84 is supplied via the driver circuit 73 and is connected to the ground connection 57 of the second supply network 56, 57. The other load 85 is supplied directly via the supply line and is connected to functional ground 86 via the driver circuit 74.

Since in the case of the control electronics illustrated in FIG. 4 the communication circuit 70 and therefore the communication interface which is made available, i.e. the CAN bus 64, is fed via the first supply network 45, 46, the reference of the bus signals on the CAN bus 64 is the ground connection 46 of the first supply network 45, 46. Crosstalk of signals starting from the loads 84, 85 onto the CAN bus 64 can be ruled out or at least highly damped because the loads 84, 85 are referred to the electrically isolated ground connection 57 of the second supply network 56, 57. As a result, interference on the communication network can be reduced. In order to protect the components, the ESD protective circuit 76 can optionally be provided. Such a protective circuit 76 is, as mentioned, expedient in particular if a specific treatment of the control unit 69 or of the application 79 takes place, for example static charging during electrostatic surface coating. The protective circuit 76 is connected to the control unit 68 by the ground connection 87. The ground connection 57 of the second supply network 56, 57 is grounded via the housing of the application 79 and the ground connection 88. The control electronics 89 of the tractor 42 are shown only figuratively in FIG. 4, wherein, for more details, reference is made to the statements relating to FIG. 3, in particular to the tractor control unit 47 described there.

The activation of the ignition, cf. FIG. 3, brings about, as already indicated above, the switching on of the control electronics of the connected control unit 68 according to FIG. 4. Here, a voltage which is present at the first supply network 45, 46 is detected by the voltage detector 78, and a corresponding signal is passed on to the central supply circuit 71. The central supply circuit 71 subsequently closes the switch 77 and as a result establishes a temporary supply of the logic circuit 69 via the supply line 45 of the first supply network 45, 46 and the ground connection 57 of the second supply network 56, 57. The communication circuit 70 is fed by the supply line 45 and the ground connection 46 of the first supply network 45, 46. The logic circuit 69 which is supplied in this way confirms its supply via the local signal line 81 and the communication circuit 70, i.e. by sending a corresponding message on the CAN bus 64. As soon as the supply on the second supply network 56, 57 is established, the central supply circuit 71 detects this and opens the switch 77. Starting from this time, the logic circuit 60 is supplied via the second supply network 56, 57 and is electrically isolated from the communication circuit 70 and the CAN bus 64. The central supply circuit 71 is additionally configured, in the event of temporary failures of the supply on the second supply network 56, 57, to close the switch 77 again for the duration of the failure and therefore ensure interruption-free supply of the logic circuit 69. The same applies for a defined time period, e.g. two seconds, after the switching off of the ignition, during which the supply on the second supply network 56, 57 has already ended, and the supply on the first supply network 45, 46 is maintained.

While the switch 77 is closed, although the electrical isolation between the supply networks is eliminated, the switch is closed, in the preferred embodiments described above, essentially only during those time periods in which no voltage is applied on the second supply network 56, 57. That is to say in this time period it is, of course, not possible for the loads which are supplied exclusively via the second supply network 56, 57 to be supplied and therefore operated, and accordingly crosstalk to the CAN bus cannot occur either.

The switch 77 is in this exemplary embodiment a MOSFET of the p-type with an impedance in the switched-off state of e.g. 5 or 10 MOhm. The requirements of the ISO 11783 are therefore satisfied with the control electronics shown by virtue of the fact that in the voltageless state of the system the switch 77 is opened and therefore the minimum isolation impedance between the supply networks, i.e. in particular between the ground connections 46, 57 of the supply networks, is complied with.

LIST OF REFERENCE NUMBERS

1 Tractor
2 Implement
3 Cable harness
4 Ground connection
5 Supply line
6 Negative pole
7 Battery
8 Positive pole
9 Functional ground connection
10 Tractor control unit
11, 12, 13 Control units for tractor
14 Local control unit
17 Ignition switch
18 Ignition signal line
19 CAN bus
20 Local communication connections
21 Ground connections
22 Ground connections
23 Direct connecting lines
24, 25, 26 Control units for implement
27 Local communication connections
28 Control unit
29 Logic circuit
30 Communication circuit
31 Supply circuit
32, 33 Driver circuits
34 Communication circuit
35 Protective circuit (ESD)
36 Network connection
37 Local signal line
38 Local network connection
39, 40 Loads
42 Tractor
43 Implement
44 Cable harness
45 Supply line
46 Ground connection
47 Tractor control unit
48, 49 Control units for tractor
50 Optional control unit for tractor
51 Control unit for implement
52 Optional control unit for implement
53, 54 Local control units for tractor
55 Equi-potential
56 Supply line
57 Ground connection
58 Negative pole
59 Battery
60 Positive pole
61 Ignition switch
62 Ignition signal line
63 Supply line 64 CAN bus
65, 65' Local control lines
68 Control unit
69 Logic circuit
70 Communication circuit
71 Central supply circuit
72 Local supply circuit
73, 74 Driver circuits
75 Local communication circuit
76 Protective circuit
77 Switch
78 Voltage detector
79 Application
80 Network connection
81 Local signal connection
82 Separate region
83 Network connection
84, 85 Loads
86 Ground
87, 88 Ground connection
89 Control electronics for tractor

The invention claimed is:

1. Control electronics for an agricultural or forestry vehicle or an agricultural or forestry machine, comprising power connections for at least a first supply network and a second supply network, and at least one network connection, the control electronics comprising:
a communication circuit configured to transmit data via the network connection, the communication circuit supplied via the first supply network, and
a logic circuit which coupled to the communication circuit, the logic circuit comprising at least one control output configured to control an electrical load supplied via the second supply network, wherein the control electronics comprise at least one switch configured to connect the first supply network to the second supply network, the two supply networks having at least one defined minimum isolation impedance in a switched-off state of the at least one switch.

2. The control electronics as claimed in claim 1, wherein the switch is a MOSFET.

3. The control electronics as claimed in claim 2, wherein the MOSFET is of the p-type.

4. The control electronics as claimed in claim 1, wherein the defined minimum isolation impedance between the reference potentials of the two supply networks is at least 1 Megaohm.

5. The control electronics as claimed in claim 1, wherein the at least one switch is connected downstream of the at least one control output of the logic circuit.

6. The control electronics as claimed in claim 1, wherein the logic circuit is supplied via the second supply network, and wherein the switch is connected between the connection for the first supply network and the logic circuit, the logic circuit configured to provide a temporary supply via the first supply network.

7. The control electronics as claimed in claim 6, wherein the logic circuit is coupled to the communication circuit via at least one of a transformer, a capacitor, an optocoupler, an optical waveguide and a relay.

8. The control electronics as claimed in claim 6, wherein after an ignition signal of the agricultural or forestry vehicle or of the agricultural or forestry machine the first supply network is connected to a voltage supply, the switch of the control electronics is closed having been triggered by the voltage at the first supply network, and a temporary supply of the logic circuit is provided via the first supply network, the logic circuit confirms the established supply via the communication circuit and the network connection, and the second supply network is subsequently connected to a voltage supply.

9. The control electronics as claimed in claim 8, wherein the switch is opened having been triggered by the voltage at the second supply network, and the temporary supply of the logic circuit via the first supply network is ended, wherein the communication circuit continues to be supplied by the first supply network.

10. A method for switching on control electronics for an agricultural or forestry vehicle or an agricultural or forestry machine, comprising power connections at least for a first supply network and a second supply network, and at least one network connection, wherein the control electronics contain a communication circuit configured to transmit data via the network connection, the communication circuit supplied via the first supply network, and a logic circuit coupled to the communication circuit, and at least one control output for controlling an electrical load supplied via the second supply network, wherein the control electronics have at least one switch configured to connect the first supply network to the second supply network the two supply networks, having at least one defined minimum isolation impedance in a switched-off state of the at least one switch, the logic circuit supplied via the second supply network, the switch connected between the connection for the first supply network and the logic circuit, the logic circuit configured to provide a temporary supply via the first supply network, comprising the steps of:
after an ignition signal of the agricultural or forestry vehicle or of the agricultural or forestry machine the first supply network is connected to a voltage supply,
the switch of the control electronics is closed having been triggered by the voltage at the first supply network, and
a temporary supply of the logic circuit is provided via the first supply network,
confirming at the logic circuit the established supply via the communication circuit and the network connection, and
subsequently connecting the second supply network to a voltage supply.

11. The method as claimed in claim 10, further comprising:
opening the switch in response to the voltage at the second supply network, and
ending the temporary supply of the logic circuit via the first supply network, and continuing to supply the communication circuit by the first supply network.

* * * * *